Oct. 27, 1931.  A. E. COLLINS  1,828,997
APPARATUS FOR REENFORCING THE SEAMS OF BATHING CAPS AND OTHER ARTICLES
Filed Dec. 20, 1929  5 Sheets-Sheet 1
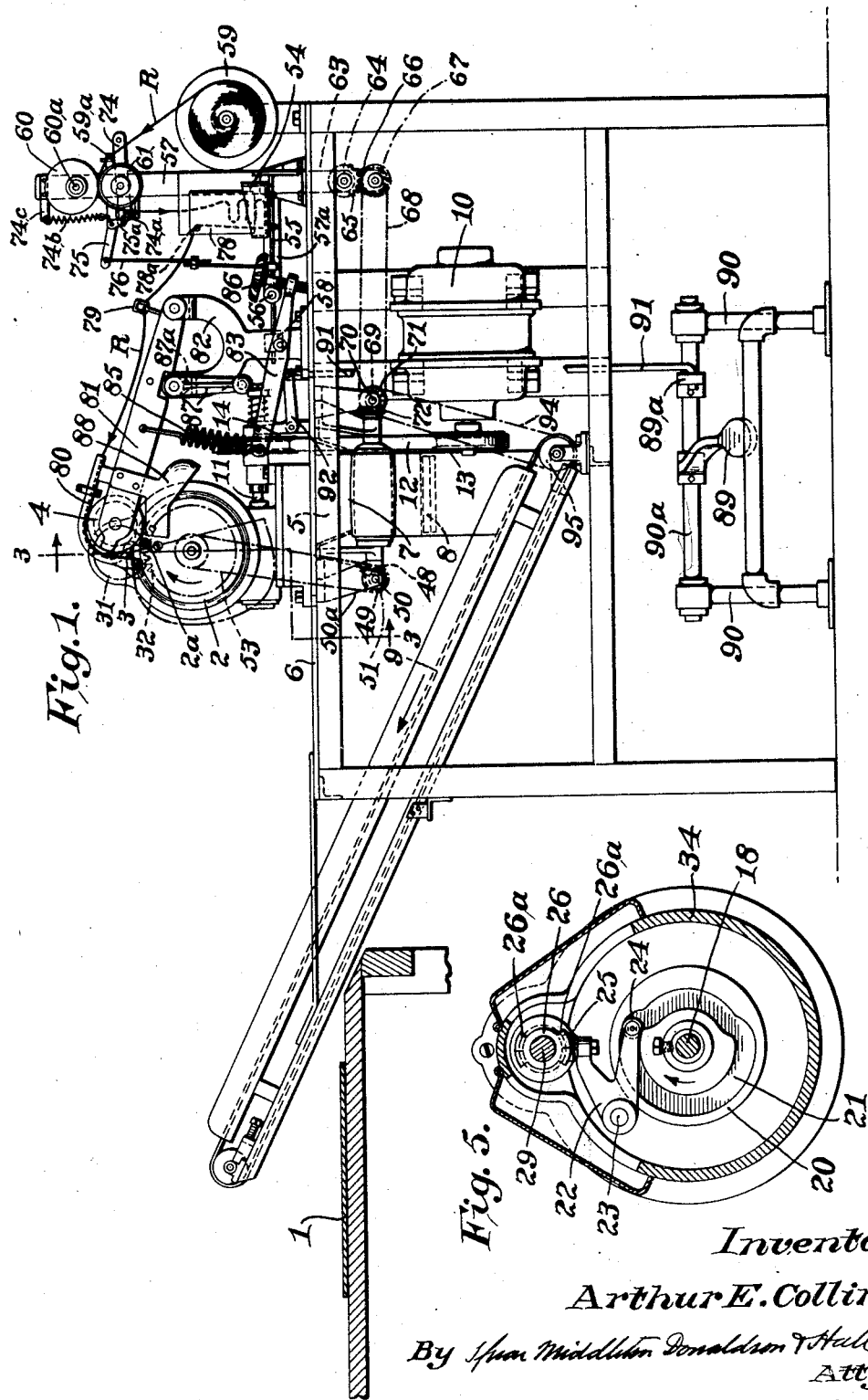
Inventor:
Arthur E. Collins,
By Spun Middleton Donaldson & Hall
Attys.

Oct. 27, 1931.  A. E. COLLINS  1,828,997
APPARATUS FOR REENFORCING THE SEAMS OF BATHING CAPS AND OTHER ARTICLES
Filed Dec. 20, 1929  5 Sheets-Sheet 2
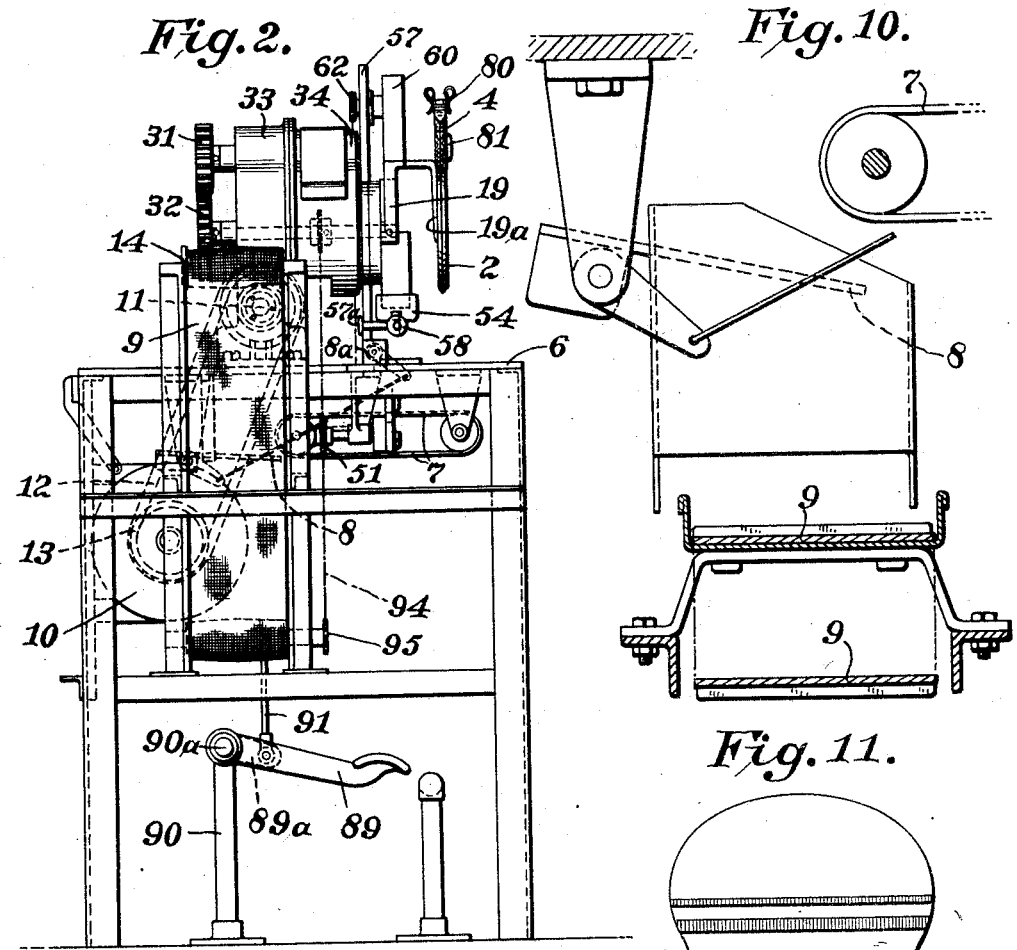
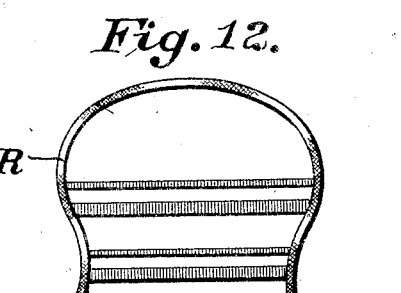
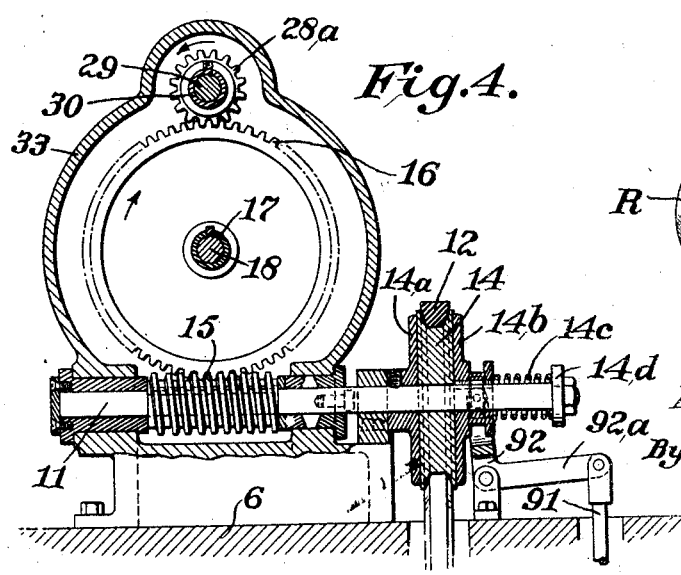
Inventor:
Arthur E. Collins,
By Spear Middleton
Donaldson Hall
Attys.

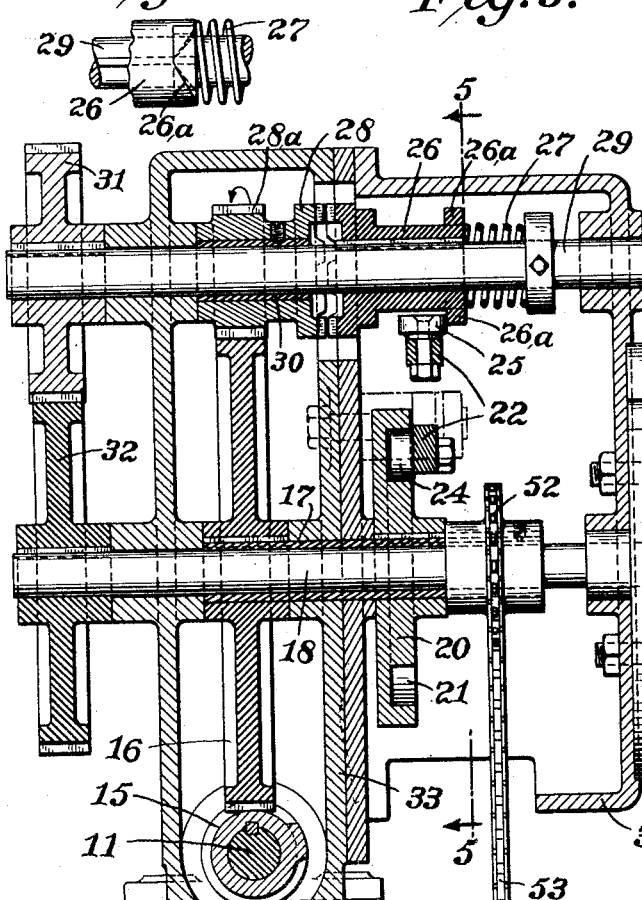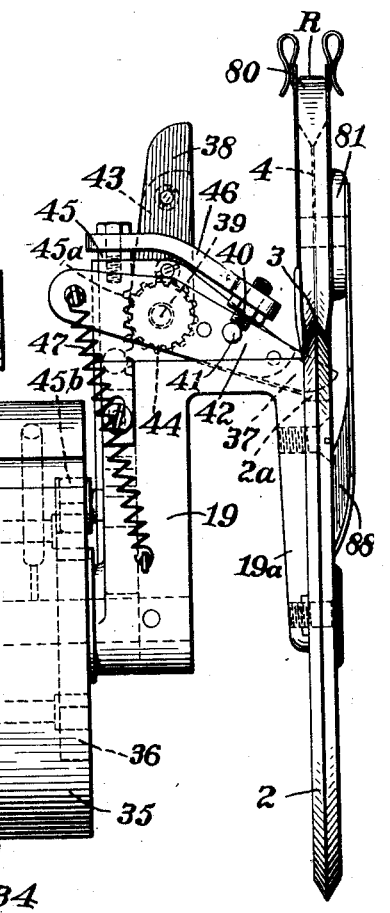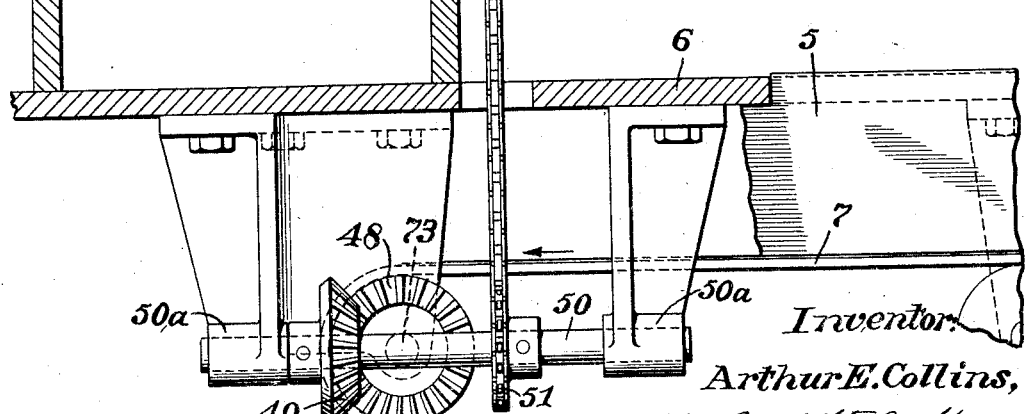

Oct. 27, 1931.   A. E. COLLINS   1,828,997
APPARATUS FOR REENFORCING THE SEAMS OF BATHING CAPS AND OTHER ARTICLES
Filed Dec. 20, 1929   5 Sheets-Sheet 4

Inventor:
Arthur E. Collins,
By Hugh Middleton Donaldson & Hall
Attys.

Oct. 27, 1931.   A. E. COLLINS   1,828,997
APPARATUS FOR REENFORCING THE SEAMS OF BATHING CAPS AND OTHER ARTICLES
Filed Dec. 20, 1929   5 Sheets-Sheet 5
Fig. 7.
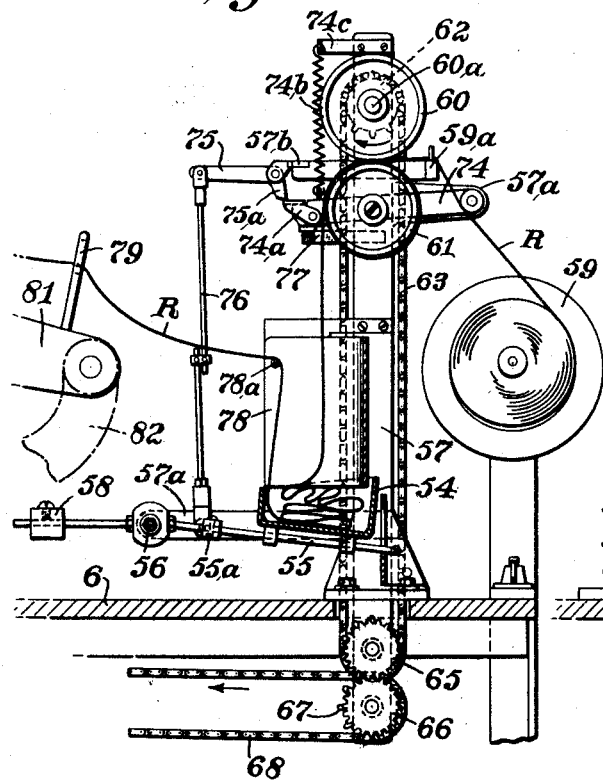
Fig. 8.
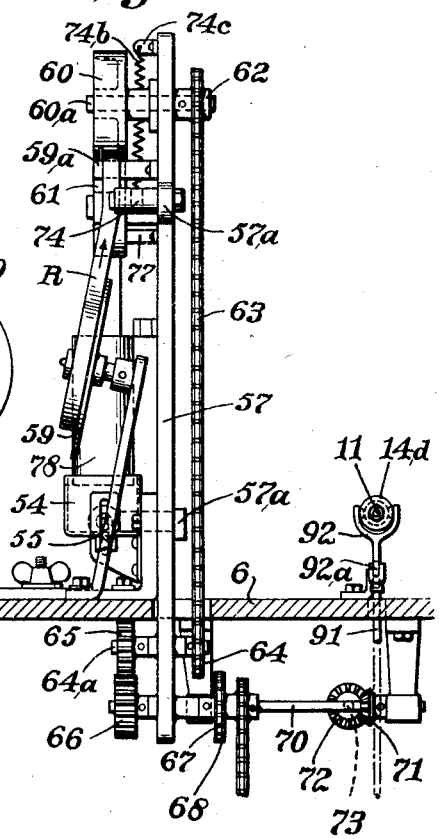
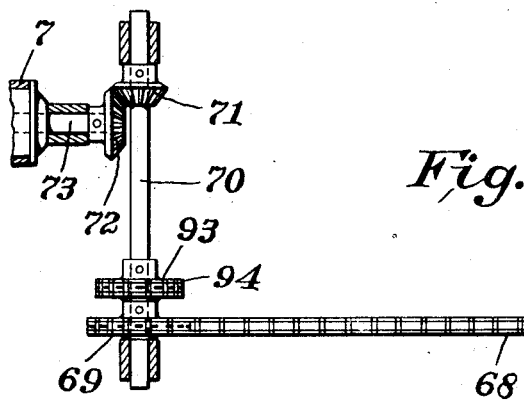
Fig. 9.
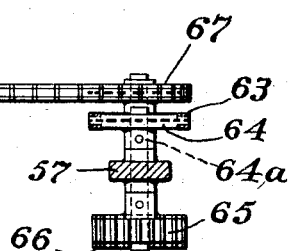
Inventor:
Arthur E. Collins,
By *Spear Middleton Donaldson & Hall*
Attys.

Patented Oct. 27, 1931

1,828,997

UNITED STATES PATENT OFFICE

ARTHUR E. COLLINS, OF CUYAHOGA FALLS, OHIO, ASSIGNOR, BY MESNE ASSIGNMENTS, TO THE MILLER RUBBER COMPANY INC., OF WILMINGTON, DELAWARE, A CORPORATION OF DELAWARE

APPARATUS FOR REENFORCING THE SEAMS OF BATHING CAPS AND OTHER ARTICLES

Application filed December 20, 1929. Serial No. 415,545.

My present invention relates to means for applying a surface or reenforcing strip of rubber to the cut together seams of sheet rubber articles, such as bathing caps and is in the nature of an improvement on the hand operated apparatus which forms the subject of United States Letters Patent, 1,458,801, dated June 12, 1923. The invention is particularly designed for reenforcing the seams of rubber bathing caps and articles of a similar pocket like nature, but is not limited to any specific articles, though for convenience, it will be described as used in the manufacture of bathing caps.

The invention aims to provide a machine which will be power driven and largely automatic in its nature, the operator needing only to attend to the placing of the caps in position and the machine operating automatically to apply the ribbon to the seam to overlie the same and greatly strengthen it.

The invention further aims to provide a machine in which the applying means will operate intermittently or in distinct cycles, automatically delivering the cap at the end of each cycle and pausing long enough to permit the insertion of a fresh cap.

The invention further aims to provide means for automatically feeding the ribbon in continuous strip form in a manner to avoid undue tension thereon and to avoid accumulation of any excess material at or adjacent the point of application.

Another object is to provide automatic means for severing the ribbon adjacent the edge of the cap in such a manner as not to interfere with the delivery thereof.

The invention also aims to provide a machine which will be capable, in its operations, of being readily controlled as to starting and stopping, in addition to its automatic cycle of operations.

With these, and other objects in view which will be apparent from the following description, the invention includes the novel features of construction and arrangement and combination of parts hereinafter described, the invetion being defined by the claims appended hereto.

What I at present consider the preferred embodiment of the invention is illustrated in the accompanying drawings in which:

Fig. 1 is a front elevation of the apparatus;

Fig. 2 is an end elevation as viewed from the left of Fig. 1;

Fig. 3 is an enlarged sectional detail substantially on line 3—3 of Fig. 1;

Figure 6:
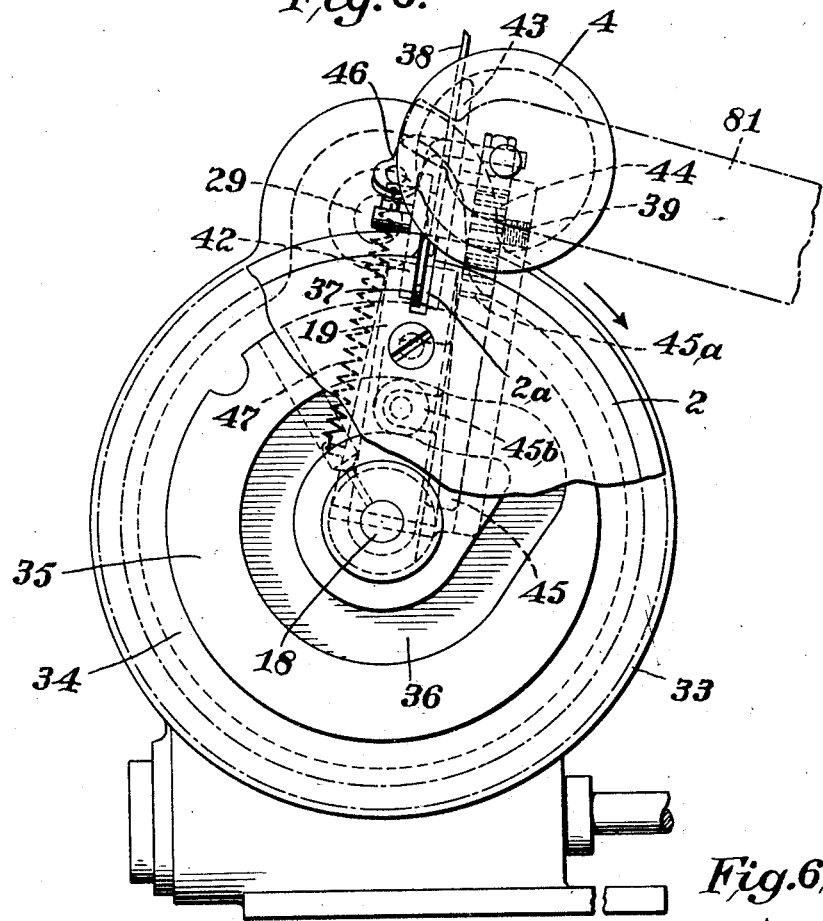
Figures 6A, 6B:
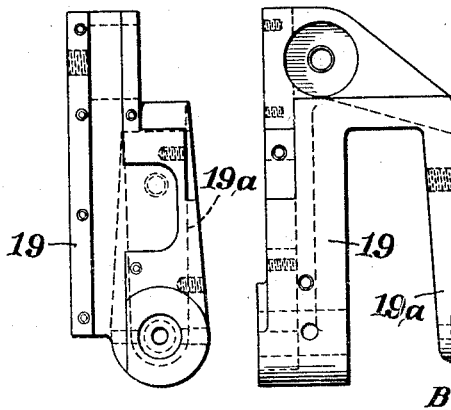
Figure 6C:
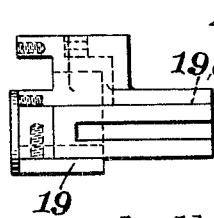
Figure 6D:
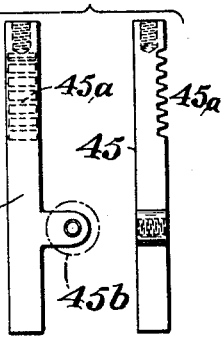

Figure 3ª is a detail plan of clutch member;

Fig. 4 is an enlarged sectional detail main clutch and drive mechanism;

Fig. 5 is a sectional view of the automatic clutch mechanism on line 5—5 of Fig. 3;

Fig. 6 is an enlarged detail view illustrating the automatic cutting or shearing mechanism and cooperating parts;

Figs. 6ª, 6ᵇ, 6ᶜ and 6ᵈ are detail views of parts shown in Fig. 6.

Fig. 7 is an enlarged detail in front elevation, with parts in section, of the automatic reenforcing ribbon feed mechanism;

Fig. 8 is a view of the parts shown in Fig. 7 as viewed from the right of said figure;

Fig. 9 is a plan view of the drive mechanism of Figs. 7 and 8 below the line of table 6;

Fig. 10 is an enlarged detail showing parts adjacent the initial end of the conveyor 9 which latter is shown in section;

Fig. 11 is a view of the cap before the reenforcing tape or ribbon is applied; and Fig. 12 is a view of the cap as it appears after application of said reenforcing tape or ribbon.

At the outset it may be stated that the present machine is designed particularly to apply reenforcing strips or ribbons to bath caps as made by the method and apparatus disclosed in an application filed by me in the United States Patent Office on the 19th day of September, 1929, Serial Number 415,-544, the cap material being conveyed from the die press of said application by a suitable table conveyor past operators who remove the cut caps from the stock sheet, straighten the same out and inspect them and pass them on to the present machine (or machines), by means of said conveyor from which the operator picks the cap for insertion in the reenforcing machine.

Such table conveyor is indicated at 1, being a flat endless belt passing over a supporting table and driven in any suitable manner by means not shown inasmuch as the same forms no part of the present invention.

The cap when lifted from the conveyor, is placed by the operator on what I may term a carrier roll 2 which is of approximately disk from and which has coacting therewith a yieldingly mounted presser roll 4 likewise of disk form.

The presser roll or disk has a channeled periphery and the carrier roll or disk of correspondingly shaped periphery of male formation to coact with the female formation of the presser roll, these peripheries being preferably of V and wedge shape respectively as shown. In applying the cap to the carrier roll, it is held with its open edge opened out and directed forwardly and is slipped over the front edge of the roll 2 into the position shown in Fig. 1 where one end of the seam abuts against or lies closely adjacent to, the end of the guide 80 for the ribbon R which is fed to the guide in the manner hereinafter particularly described.

The cap is of course applied to the carrier roll while this is at rest and when so positioned is ready to have the end of the seam pass into the bight of the carrier and presser rolls along with the reenforcing strip or ribbon, the entire length of the seam being carried through between the rolls by one rotation thereof and the ribbon being likewise carried therethrough and applied to and rolled down upon the seam and effectually welded thereto due to the nature of the unvulcanized material of which the caps and ribbon are made.

At the end of the ribbon applying and rolling down operation, the rolls will come to rest at which time, the position of the cap will be reversed in that it will embrace the rear half or portion of the carrier wheel instead of the front half, thereby leaving the front half or portion ready for the application of a fresh cap.

Shortly after the beginning of the next cycle of operation cutter mechanism hereinafter described, severs the ribbon or tape R between the preceding and succeeding caps whereupon the preceding reenforced cap will drop off or away from the roll 2 by gravity and drop into an opening 5 of hopper shape formed in the table 6 onto a transverse horizontal conveyor 7. By belt 7, the caps are conveyed to and dropped onto a trap door 8 which is counterbalanced just sufficiently to be overbalanced and operated by the weight of the cap.

Trap door 8 is connected to operate suitable counting mechanism 8a. After leaving the trap door, the article falls on the lower end of an inclined elevating conveyor 9 which delivers it to the main conveyor 1 of the system referred to.

By severing the tape or ribbon at the commencement of the reenforcing operation, I ensure that the tape will be in proper position between the bight of the rolls for accurate application to the succeeding cap, as there is no loose end to be accidentally displaced.

Power is applied to operate the machine from an individual motor 10 (preferably electric), which drives the main shaft 11 through transmission means such as belt 12 and belt pulleys 13 and 14, the former being fast on the motor shaft and the latter connected to shaft 11 by clutch means for connecting and disconnecting the drive.

The clutch means is shown in detail in Fig. 4 wherein it will be seen that pulley 14 is rotatably mounted on shaft 11 between a disk 14a fast on the shaft and an opposed disk 14b having a hub splined on the shaft and provided with an annular groove to engage the pins of a shifter fork formed as a part of bell crank lever 92 fulcrumed on a fixed pivot and having its arm 92a connected by a link 91 with an arm 89a fast on a rock shaft 90a carried by standards 90 beneath the machine table or frame, which rock shaft carries a treadle lever 89 located within convenient reach of the foot of the operator.

Disk 14b is normally pressed into contact with pulley 14 by spring 14c encircling the projecting end of the shaft between the hub of the disk and an abutment disk 14d secured to the end of the shaft, so that the drive is normally connected but capable of being disconnected at will by pressure on treadle 89.

Shaft 11 has fast thereon a worm 15 which meshes with a worm wheel 16 which is keyed or otherwise suitably secured to a sleeve 17 rotatably mounted about a transmission shaft 18 to which the carrier wheel 2 hereinbefore referred to is rigidly connected in the manner hereinafter described.

Sleeve 17 has affixed to its opposite end cam member 20 provided with a cam groove 21 in the face thereof designed to operate clutch means to impart intermittent rotary motion to shaft 18 and carrier roll or disk 2.

For this purpose, I provide a bell crank lever 22 articulated on a fixed pivot 23 on the gear casing or housing and having one arm provided with a roller 24 engaging the cam groove 21 (see Fig. 5), while the other arm carries a roller 25 designed to coact with either of a pair of cam projections 26a of a clutch member 26 splined on a counter shaft 29 and designed to coact with clutch member 28 forming a part of or rigidly connected with a gear 28a both clutch 28 and gear 28a being rotatably carried by counter shaft 29 through the intermediary of sleeve 30.

The gear 28a has teeth designed to mesh with the teeth of worm gear 16 whereby said gear 28a and clutch member 28 are driven continuously except when treadle 89 is operated to disconnect the motive power as before explained.

Fast on shaft 29 is a gear 31 which meshes with a gear 32 fast on the shaft 18 whereby said shaft 18 and carrier roll or disk 2 will be driven only when clutch members 26 and 28 are in engagement.

Cam groove 21 is so designed that roller 25 will be moved out of the path of cam projections and held in such position for a long enough period to permit shaft 18 to make one complete rotation, the clutch members 26—28 being automatically engaged at such time by the action of spring 27 on sliding clutch member 26, and to disengage the clutch members by the action of roller 25 on one of the cam projections 26a and hold them out of engagement and hence the shaft 18 and carrier roll or disk 12 stationary for a period sufficient to enable the operator to apply a fresh cap for reenforcement as hereinbefore described.

The drive gear housing 33 is suitably affixed to or carried by the table top and has affixed to its front face and forming virtually a part thereof a casing member 34 which carries a cam ring 35 encircling the shaft 18 and provided with a face cam groove 36 for actuating the ribbon cutting mechanism hereinbefore mentioned. This ribbon severing mechanism is carried by a carrier head 19 for the wheel or disk 2 and due to bathing caps being of pocket shape and open only on one side, said carrier head is of approximately U-shape as shown in Figs. 2 and 3, having one arm (19) secured to the shaft and the other arm 19a spaced therefrom and having the disk or roll 2 rigidly secured thereto by means such as a screw bolt as shown, said roll or disk 2 being arranged in axial alinement with said shaft 18.

The disk or roll 2 has a radial slot or recess 2a in its periphery in which normally rests (beneath the ribbon or tape), a shear or cutter blade 37 which coacts with a shear or cutter blade 38, the two forming in effect a pair of shears, having a common pivotal axis at 39.

Blade 37 is carried by an arm 42 pivotally mounted on the portion of the head 19 which connects the two arms thereof so as to swing about axis 39 in a plane coincident with said slot 2a and a tension spring 47 connected with said arm tends to swing it in a direction to move it out of the slot and towards the other shear member 38. Said shear member 38 is carried by an arm 43 mounted on the head to swing about the same axis 39 as arm 42, and said arm 43 has fast thereon, concentric with its axis, a gear 44 which meshes with a rack 45 slidably guided on the back face of the carrier member 19 and which rack carries a roller 45b which engages the cam groove 36 in the cam member 35 (see Fig. 6).

The rack has affixed to the end thereof an arm 46 having an inwardly inclined portion provided with an adjustable contact screw 40 designed to contact with a pin or abutment 41 on the arm 42. The result of this arrangement is that while the head 19 and disk 2 are rotating and the roller 45b is traveling around the concentric and low portion of the cam groove, the slide or rack will be held in its innermost position and the shear blades separated as shown in Fig. 3 due to the action of gear on the rack and the action of arm 46 on blade arm 42. When the roller travels through the high or non-concentric part of the cam groove the slide will first be moved outward which will cause the gear to rotate to swing arm 43 and blade 38 downward towards blade 37, and which will simultaneously remove restraining arm 46 whereby blade arm 42 will be swung outward by its spring 47 and thus the shears will be brought together to sever the tape at the time in the cycle of operations heretofore referred to. As the roller moves inward towards the concentric portion of the cam groove, the reverse operation will take place and the shears restored to normal open position.

The unvulcanized rubber tape used for seam reenforcement purposes is of such a character that I find the best results are secured by feeding it from a pile or accumulation of slack loops rather than direct from the rolls on which such material is wound at the time of manufacture.

To enable this to be done without the accumulation of too much slack, I provide the following mechanism.

A slack tape receiver is provided in the shape of a small box or receptacle 54 which is rigidly carried by a lever 55 fulcrumed at 56 to a bracket arm 57a of the vertical bracket or standard frame 57 carried by the table and provided with adjustable counterweight means such as counterweight 58 adjustable longitudinally of said lever. The ribbon or tape R, I have indicated conventionally, a supply reel or spool 59 of tape rotatably supported by brackets or standard on the table from which the tape passes over guide 59a between suitable guide pins and thence to and between coacting feed rolls 60 and 61 from which it descends into the receptacle 54.

The roll 60 is eccentrically mounted on shaft 60a journaled at the upper end of standard 57 and is driven through sprocket 62 fast on said shaft, chain 63, sprocket 64 on shaft 64a journaled in an extension of said standard beneath the table, which shaft carries gear 65 meshing with gear 66 to secure reversal of movement. Gear 66 is fast on a short shaft also journaled in said standard 57 which is driven by sprocket 67 and chain 68 from a sprocket 69 on shaft 70 which is driven by bevel gears 71—72 from the shaft 73 of the horizontal belt conveyor 7 which moves continuously.

Reverting to the ribbon feed roll construction, the lower roll 61 is an idle roll and is preferably provided with a felt covered rim or periphery for frictional engagement. Said wheel 61 is journaled on a substantially horizontally disposed carrier arm 74 pivoted to an offset or lateral extension 57a of standard 57 to provide a floating support for the roll.

The free end of arm 74 has pivoted thereto a dog 74a designed to yield or move in an upward direction only relative to arm 74, and said free end of arm 74 is connected by tension spring 74b with the an arm 74c projecting from the top of the standard.

By this arrangement, the roll 61 is normally yieldingly pressed into contact with the eccentric roll and as the latter revolves roll 61 will be moved up and down and carrier arm 74 swung to a degree corresponding to the eccentricity of roll 60.

An arm 75 fulcrumed on a bracket extension 57b of the standard has an angularly turned end 75a designed in one position of the arm 75 to overlie the dog 74a and contact therewith and in another position to lie outside the path of said dog as it is moved up and down by the action of the eccentric roll. The free end of arm 75 is connected by link or rod 76 to a pivot block 55a adjustably fastened on the pivoted rod 55 which carries the receptacle 54.

The counter balance weight 58 is so adjusted as to be overbalanced by the receptacle 54 when the desired amount of slack is accumulated therein, and to raise said receptacle when there is an insufficient supply of tape thereon. When this latter occurs, the dog or projection 75a will be moved out of the path of the dog or pawl 74a and the floating roll 61 will remain in contact with the eccentric roll through its entire cycle of movement and a maximum feed of tape will result.

This will increase the supply in the receiver until the weight thereof is sufficient to depress the receiver which will pull down on rod 76 and swing dog 75a into position to contact with dog or pawl 74a.

Should the floating roll be in its upper position at the time of such movement, downward movement of arm 74 and pivoted dog 74a will cause the latter to pivot on contact with dog 75a until it rides past the latter and drops into engaging position below the same. As the eccentric roll continues its rotation and its surface recedes upwardly, the floating roll will be prevented from following and thus the feed will be stopped for a portion of the cycle of rotation of the eccentric roll and this will continue until the amount of tape in the receiver has been again depleted. A spring brake finger 77 is provided to bear against the side of roll 61 to prevent overthrow.

A guide casing 78 is mounted just above the box 54 to assist in placing the ribbon therein and across the upper portion of this guide casing is a pin 78a over which the ribbon is drawn, and through suitable guides 79 and 80 to the point of contact with the bath cap.

The pressure roll or disk 4 is mounted on the free end of a spring pressed lever 81, which is fulcrumed in a yoke-shaped bracket 82 fixed to the table top, and is provided with a lever 83 fulcrumed near its base, one end of which is connected to a strong spring 85, and its other end provided with a hand wheel screw 86 to vary the tension of the pressure disk to its work.

The pressure disk 4 may be lifted clear of its engagement with the disk 2 by operating the handle 87 to elevate its cam 87a under the lever 81.

To protect the operator and also to assist in the proper guiding of the bath cap in its rotation with the disk 2, the guard plate 88 is provided, by mounting it on the lever 81.

By the use of the clutch controlled by the foot pedal 89, the mechanism may be stopped at any time in its cycle of automatic action where this is desired due to misplacement of cap or other reason, such stopping in no way disturbing the timing of the cycle.

The inclined conveyor 9, hereinbefore referred to, for carrying the reenforced articles up to the main conveyor 1 is preferably driven from shaft 70 by means of sprocket 93, chain 94 and sprocket 95.

In order to drive the belt conveyors 7 and 9 and the ribbon feeding mechanism a sprocket 52 is mounted on the quill 17 previously described and which it will be recalled receives continuous motion from the electric motor. A shaft 50 is mounted in bracket 50a below the table and carries the sprocket 51 and the bevel gear 49 fixed thereon (Fig. 3). A chain 53 drives sprocket 51 from sprocket 52. A bevel gear 48 is mounted on one end of shaft 73 previously described and meshes with the gear 49. The means by which the ribbon-feeding mechanism and conveyor belt 9 are driven from shaft 73 have previously been described. Through this train of mechanism the ribbon feeding mechanism and belts 7 and 9 are driven continuously, except when pedal 89 is depressed.

I claim:

1. Apparatus for applying a surface strip of rubber to a seamed sheet comprising a pair of coacting power-driven rolls, one having a female or channeled periphery and the other a corresponding periphery of male formation, and means coacting therewith for automatically supplying a ribbon strip to said rolls under uniform tension coincident with the passage of the seamed sheet therebetween.

2. Apparatus for applying a surface strip of rubber to a seamed sheet comprising a pair of coacting power-driven rolls, one having a female or channeled periphery and the other a corresponding periphery of male formation, means cooperating therewith for supplying a ribbon strip between said rolls coincident with the passage of the seamed sheet therethrough, and means for automatically severing the applied portion of the tape from the main body thereof.

3. Apparatus for applying a reenforcing ribbon of rubber to a seamed sheet, comprising a pair of coacting power-driven rolls having respectively male and female peripheries, means for intermittently rotating one of said rolls, means cooperating therewith for supplying a reenforcing ribbon under uniform tension to the seamed sheet passing between said rolls, and means for automatically severing the ribbon adjacent the sheet.

4. Apparatus for applying a reenforcing strip of rubber to the seams of articles comprising a pair of coacting power-driven rolls, means for supplying a continuous strip between said rolls under uniform tension coincident with the passage of the article seams therebetween, and means controlled by the rotation of one of said rolls for severing the strip between successive articles after its application to a preceding article and just after the commencement of its application to the succeeding article.

5. Apparatus for applying a reenforcing rubber ribbon to a seamed sheet, comprising a carrier head with means for rotating it, a sheet supporting roll carried by said head, a presser roll coacting therewith, means for automatically supplying a ribbon to the seam of the sheet under uniform tension as it passes through the bight of said rolls, cutter means carried by said head, and means for automatically actuating said cutter means when the supporting roll reaches a determined position.

6. Apparatus for applying a reenforcing rubber ribbon to a seamed sheet, comprising a carrier head with means for rotating it, a supporting roll for the seamed sheet rigidly carried by said head, a presser roll coacting with said supporting roll, said supporting roll having a radial recess in its periphery, a shear member pivotally carried by said head and normally resting in said recess, means for feeding a ribbon to the sheet passing through said roll, means for raising said shear member out of the recess when the carrier roll reaches a predetermined position, and means coacting with said shear member to effect severing of the ribbon.

7. Apparatus for applying a reenforcing rubber ribbon to a seamed sheet comprising a carrier head with means for rotating it, a supporting roll for a seamed sheet rigidly carried thereby, a presser roll coacting with said supporting roll, means for feeding a reenforcing ribbon to the seam of the sheet passing between said rolls, said supporting roll having a radial recess in its periphery, a pair of normally separated coacting shear blades carried by said head, one of said blades normally resting in said recess, and means for actuating said shear blades to sever the ribbon when the carrier roll reaches a predetermined position.

8. Apparatus for applying a reenforcing rubber ribbon to a seamed sheet comprising a carrier head with means for rotating it, a supporting roll for a seamed sheet rigidly carried thereby, a presser roll coacting with said supporting roll, means for feeding a reenforcing ribbon to the seam of the sheet as it passes through the bight of said rolls, said supporting roll having a radial slot in its periphery, a shear blade pivotally carried by said head and normally resting in said slot, a coacting shear blade pivotally carried by said head, and cam controlled means for actuating said shear blades to sever the strip.

9. Apparatus for applying a reenforcing rubber ribbon to a seamed sheet comprising a carrier head with means for rotating it, a supporting roll for a seamed sheet rigidly carried thereby, a presser roll coacting with said supporting roll, means for feeding a reenforcing ribbon to the seam of the sheet as it passes through the bight of said rolls, said supporting roll having a radial slot in its periphery, a shear blade pivotally carried by said head, spring means tending normally to move said blade out of said slot, a coacting blade pivotally carried by said head, means for normally holding the first named blade in the slot against the tension of its spring, and means for simultaneously releasing said holding means and actuating said coacting blade.

10. Apparatus for applying a reenforcing rubber ribbon to a seamed sheet comprising a carrier head with means for rotating it, a supporting roll for a seamed sheet rigidly carried thereby, a presser roll coacting with said supporting roll, means for feeding a reenforcing ribbon to the seam of the sheet as it passes through the bight of said rolls, said supporting roll having a radial slot in its periphery, a shear blade pivotally carried by said head, spring means tending to move said blade out of said slot, a coacting shear blade pivotally carried by said head, a gear rigidly connected with said coacting shear blade, a rack slidably carried by said head and meshing with said gear, abutment means carried by said rack for pressing the first named blade into the slot, and means for reciprocating said rack.

11. Apparatus for applying a reenforcing ribbon to bath cap seams comprising a shaft, a substantially U-shaped head having one arm fast on said shaft, a cap carrier roll fast on the other arm in axial alinement with said shaft, a presser roll coacting with said carrier roll, means for feeding a ribbon to the bight of said rolls, and means for imparting an intermittent rotary movement to said shaft.

12. Apparatus for applying a reenforcing ribbon to bath cap seams comprising a shaft, a substantially U-shaped head having one arm fast on said shaft, a cap carrier roll fast on the other arm in axial alinement with said shaft, a presser roll coacting with said carrier roll, means for feeding a ribbon to the bight of said rolls, ribbon severing means carried by said head, means for imparting an intermittent rotary movement to said shaft, and means for actuating said severing means at the beginning of each cycle of movement.

13. In apparatus of the class described a shaft with means for rotating it, a substantially U-shaped arm carried by said shaft, a carrier roll fast on said shaft, a presser roll coacting therewith, means for feeding a ribbon to the bight of said rolls, ribbon severing means carried by said head, a slide for actuating said severing means, and a stationary cam adjacent said head for operating said slide.

14. Apparatus for applying a ribbon to the seams of bath caps and like articles comprising a shaft, a substantially U-shaped head carried by said shaft, a cap carrier roll supported by said head in axial alinement with said shaft, a presser roll coacting with said carrier roll, means for feeding a ribbon to the bight of said rolls, means for intermittently rotating said shaft to rotate said head through a complete circle and cause it to temporarily dwell in inverted U position, and means for automatically severing the ribbon at the beginning of each cycle of movement.

15. Apparatus for applying a ribbon to the seams of bath caps and like articles comprising a shaft, a substantially U-shaped head carried by said shaft, a cap carrier roll fast on said head in axial alinement with said shaft, a presser roll cooperating with said carrier roll, shaft actuating means for intermittently rotating said shaft, means for feeding a ribbon to the bight of said rolls, means for severing the ribbon before the head ceases movement, said intermittent operating means being arranged to impart to said head a complete rotation and bring it to rest in inverted U position whereby the reenforced cap may drop from the carrier roll by gravity, cap counting means below said carrier head, and conveyor means arranged to receive said caps from said counting means.

16. In apparatus of the class described, the combination with a pair of coacting seam reenforcing rolls, and means for operating them in rolling engagement with each other, of ribbon feeding means comprising guide means, and ribbon supply means, said supply means including means for maintaining automatically a predetermined amount of ribbon in the form of slack loops.

17. In apparatus of the class described, the combination with ribbon applying rolls, of ribbon feeding means comprising a supply roll, feed rolls for drawing the ribbon from said supply roll, a movable counterbalanced ribbon receiver, and means whereby the movement of the receiver varies the feeding action of said feed rolls.

18. In ribbon applying apparatus, ribbon applying rolls, a ribbon supply roll, a pair of coacting feed rolls, one of which is eccentrically mounted and positively driven, and the other an idle roll yieldingly pressed towards the driven roll, a yieldingly mounted ribbon receiver arranged to receive ribbon from said feed rolls, means whereby depression of the receiver moves said yieldingly mounted roll into position for periodic contact only with said eccentric roll, and means for guiding the ribbon from said receiver to the applying rolls.

19. In ribbon applying mechanism, ribbon applying rolls, a ribbon supply roll, a pair of coacting feed rolls for drawing the ribbon from said supply roll, one of said rolls being eccentrically mounted and the other an idle roll, lever means supporting said idle roll, means tending to swing said lever means to maintain said idle roll in contact with said eccentric roll, a yieldingly mounted ribbon receiver arranged to receive ribbon from said feed rolls, and dog means connected with said receiver and arranged to be operated by depression of said receiver to engage said lever means, and means for conducting the ribbon from said receiver to said applying rolls.

20. In ribbon applying mechanism ribbon applying rolls, a ribbon supply roll, a pair of coacting feed rolls, one of which comprises an eccentric driven roll and the other an idle roll, a carrier for said idle roll movable towards and from the eccentric roll and normally yieldingly pressed towards the same, a dog pivoted on said carrier to have upward movement, a bell crank lever articulated on a fixed pivot and having an arm to engage said dog, a yieldingly mounted ribbon receiver arranged to receive ribbon from said feed rolls, means connecting said receiver with the other arm of said bell crank lever, and means for conducting the ribbon from said receiver to said applying rolls.

In testimony whereof I affix my signature.

ARTHUR E. COLLINS.